(12) United States Patent

Ohishi

(10) Patent No.: US 9,323,989 B2
(45) Date of Patent: Apr. 26, 2016

(54) TRACKING DEVICE

(71) Applicant: SAMSUNG DISPLAY CO., LTD., Yongin, Gyeonggi-Do (KR)

(72) Inventor: Hiroshi Ohishi, Yokohama (JP)

(73) Assignee: SAMSUNG DISPLAY CO., LTD., Yongin, Gyeonggi-do (KR)

( * ) Notice: Subject to any disclaimer, the term of this patent is extended or adjusted under 35 U.S.C. 154(b) by 24 days.

(21) Appl. No.: 14/099,588

(22) Filed: Dec. 6, 2013

(65) Prior Publication Data

US 2014/0161313 A1 Jun. 12, 2014

(30) Foreign Application Priority Data

Dec. 7, 2012 (JP) .................. 2012-267902

(51) Int. Cl.
*G06K 9/00* (2006.01)
(52) U.S. Cl.
CPC ................... *G06K 9/00604* (2013.01)
(58) Field of Classification Search
None
See application file for complete search history.

(56) References Cited

U.S. PATENT DOCUMENTS

| 7,620,216 B2* | 11/2009 | Hammoud | 382/117 |
| 2007/0133884 A1* | 6/2007 | Hammoud | 382/225 |
| 2007/0189627 A1* | 8/2007 | Cohen et al. | 382/254 |
| 2010/0189354 A1* | 7/2010 | de Campos et al. | 382/190 |
| 2010/0226538 A1* | 9/2010 | Yashiro et al. | 382/103 |
| 2011/0001840 A1* | 1/2011 | Ishii et al. | 348/222.1 |
| 2011/0052013 A1* | 3/2011 | Sasahara et al. | 382/118 |
| 2012/0301024 A1* | 11/2012 | Yuan et al. | 382/167 |
| 2013/0169530 A1* | 7/2013 | Bhaskar et al. | 345/157 |
| 2014/0105504 A1* | 4/2014 | Krupka et al. | 382/195 |

FOREIGN PATENT DOCUMENTS

| JP | 2005-004530 A | 1/2005 |
| JP | 2009-182624 A | 8/2009 |
| JP | 2009-230704 A | 10/2009 |
| JP | 2010-041526 A | 2/2010 |
| JP | 2010-160743 A | 7/2010 |

* cited by examiner

*Primary Examiner* — Vu Le
*Assistant Examiner* — Alexander J Lesnick
(74) *Attorney, Agent, or Firm* — Lee & Morse, P.C.

(57) ABSTRACT

A tracking device is provided which includes an image information acquiring unit configured to acquire image information in the form of successive frames; and a tracking unit configured to generate a plurality of sub images each smaller than a frame of the acquired image information, to calculate likelihoods with eye images, and to decide locations of eyes using a sub image having a large likelihood value. The tracking unit decides locations of the sub images, based on locations decided by a frame of image information acquired before the one frame.

8 Claims, 7 Drawing Sheets

TRACKING DEVICE

CROSS-REFERENCE TO RELATED APPLICATION

Japanese Patent Application No. 2012-267902, filed on Dec. 7, 2012, in the Korean Intellectual Property Office, and entitled: "TRACKING DEVICE," is incorporated by reference herein in its entirety.

BACKGROUND

1. Field

Embodiments relate to a device of recognizing and tracking an object, and more particularly, relate to a device of recognizing and tracking eyes.

2. Description of the Related Art

Commercialization of statistical learning algorithms developed recently have allowed facial recognition techniques to be widely applied. In particular, use of facial recognition techniques as applied to digital cameras or security cameras is widely known. Also, eye recognizing and tracking techniques may be applied to determining of drowsiness using a vehicle loaded camera, rendering according to a visual point of a 3D play, and so on.

However, the technique of recognizing a face and a facial part or the technique of recognizing and tracking eyes is very complicated and requires a massive amount of calculation. For this reason, in general, the technique of recognizing a face and a facial part or the technique of recognizing and tracking eyes may be implemented using software. Meanwhile, as demand for real-time processing using hardware is increasing, development of hardware for processing eye recognition and tracking in real time with respect to universal applications becomes important.

SUMMARY

One or more embodiments is directed a tracking device which includes an image information acquiring unit configured to acquire image information in the form of successive frames and a tracking unit configured to generate a plurality of sub images each smaller than a frame of the acquired image information, to calculate likelihoods with eye images, and to decide locations of eyes using a sub image having a large likelihood value. The tracking unit decides locations of the sub images, based on locations decided by a frame of image information acquired before the one frame.

The tracking device may decide locations of eyes of a next frame based on locations of eyes decided from a frame acquired before a time corresponding to a frame.

The sub images generated by the tracking unit may have a same size.

The tracking unit may apply a Gaussian filter to the one frame of the acquired image information and thins out pixels to generate the plurality of sub images, respectively.

The tracking unit may calculate likelihoods of both eyes from each of the plurality of sub images, generates a model having parameters including a distance between both eyes, a width of one eye, and an angle that a straight line linking the both eyes forms with a horizontal line, and decides the locations of the eyes.

The tracking unit may decide a location of each of the plurality of sub images using a particle filter on the parameters.

The particle filter may generate locations of sub images from which the tracking unit decides the locations of eyes within a time period where a frame is acquired.

The tracking unit may calculate likelihoods based on luminance.

The tracking unit may calculate likelihoods by comparing a sub image to a stored eye sample and a stored non-eye sample.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1:
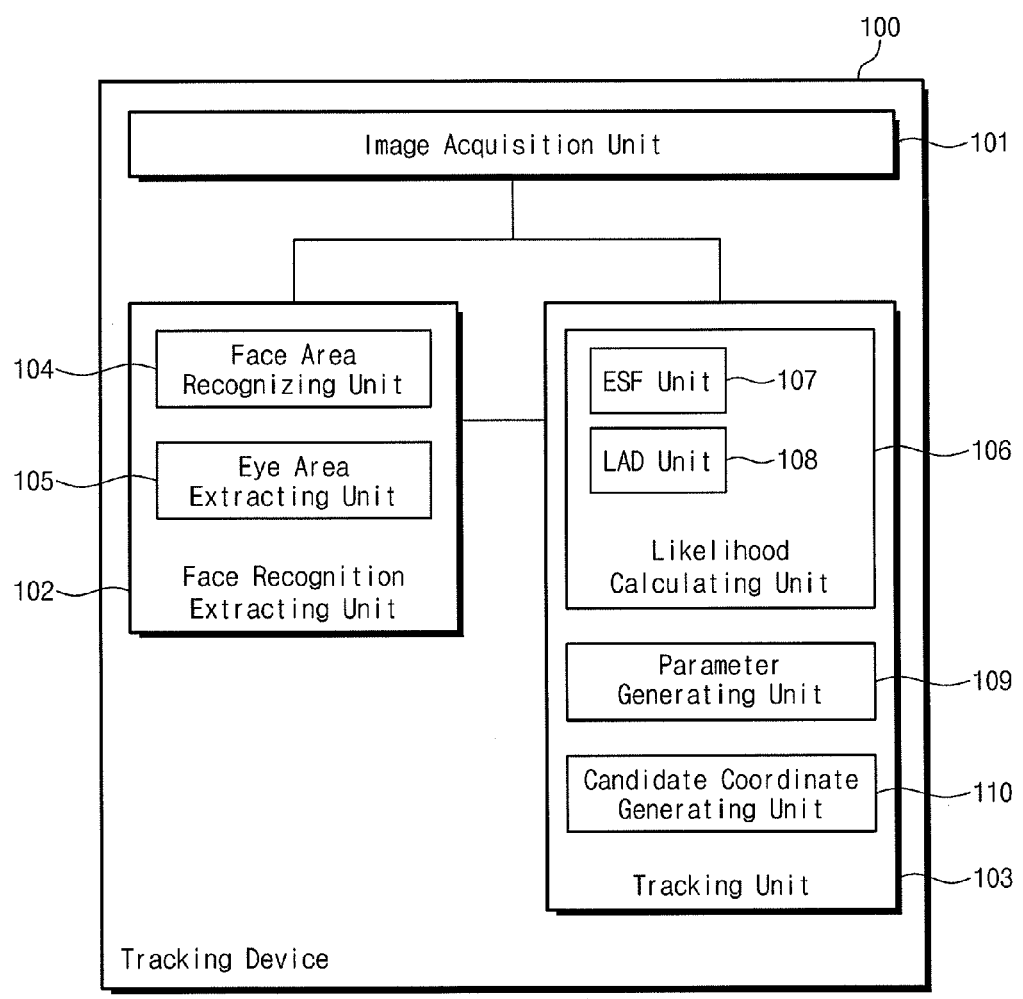
FIG. 1 is a block diagram schematically illustrating a tracking device according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. Accordingly, known processes, elements, and techniques are not described with respect to some of the embodiments. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings herein.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising,"

when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

Unless otherwise defined, all terms (including technical and scientific terms) used herein have the same meaning as commonly understood by one of skill in the art to which this disclosure belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

FIG. 1 is a block diagram schematically illustrating a tracking device according to an embodiment. Referring to FIG. 1, a tracking device 100 includes an image acquisition unit 101, a face recognition extracting unit 102, and a tracking unit 103.

The image acquisition unit 101 may acquire image information. The image information may be acquired by frame units. For example, the image information may be acquired by a ratio of 30 frames per second. The image information may be acquired by a capture device (e.g., a camera) of the tracking device 100 or from a capture device or an image information playback device connected to the tracking device 100.

The face recognition extracting unit 102 may determine whether the image information acquired by the image acquisition unit 101 includes a face image. If the face image is included, the face recognition extracting unit 102 may extract an area of an image including eyes. The face recognition extracting unit 102 may be implemented as a component independent from the tracking device 100, i.e., not included in the tracking device 100. In this case, the face recognition extracting unit 102 may be connected to the tracking unit 103.

Figure 2A:
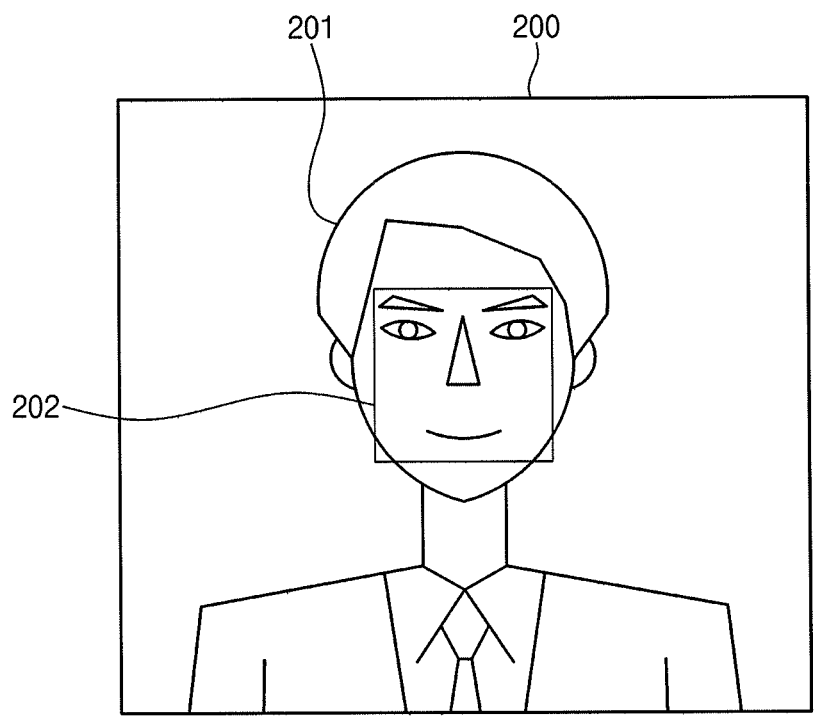
FIG. 2A and FIG. 2B illustrate a diagram for describing an operation of a face recognition extracting unit of a tracking device according to an embodiment.
Figure 2B:
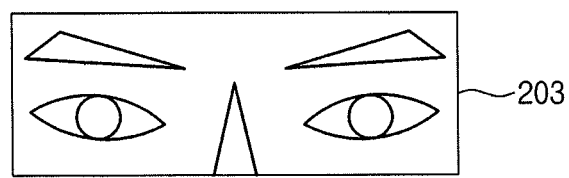

The face recognition extracting unit 102 may include a face area recognizing unit 104 and an eye area extracting unit 105 as illustrated in FIG. 1. The face area recognizing unit 104 determines whether the image information acquired by the image acquisition unit 101 includes a face image. If the face image is included, the face area recognizing unit 104 may extract an area of an image including eyes. For example, as illustrated in FIG. 2A and FIG. 2B, if the image information 200 acquired by the image acquisition unit 101 includes a face image 201, the face area recognizing unit 104 may extract a face image area 202. The area 202 may include both eyes of a face. Whether the image information acquired by the image acquisition unit 101 includes a face image may be determined using well-known techniques.

The eye area extracting unit 105 may extract an area 203 including both eyes from the face image area 202 extracted by the face area recognizing unit 104. In general, since the area 203 including both eyes is smaller in size than the face image area 202, it is possible to make a search area of the tracking unit 103 narrow and to perform a tracking operation in high speed. Extracting the area 203 including both eyes from the face image area 202 extracted by the face area recognizing unit 104 may be performed by well-known techniques.

The face recognition extracting unit 102 may not perform 2-step processing of the face area recognizing unit 104 and the eye area extracting unit 105 as illustrated in FIG. 1. For example, the face recognition extracting unit 102 may directly extract the area 203 including both eyes from image information 200 acquired by the image acquisition unit 101 using a parameter (e.g., locations of both eyes) obtained from a face recognition result.

The tracking unit 103 may detect locations of both eyes from an area (including both eyes) extracted by the face recognition extracting unit 102 as initial locations of both eyes, generate a candidate of locations of both eyes of a next frame from the detected locations of both eyes, and detect locations of both eyes of the next frame. The location of both eyes thus detected need not be limited to one. In the event that a plurality of locations is detected, location information determined not to be eyes by tracking may be discarded.

The tracking unit 103 may include a likelihood calculating unit 106, a parameter generating unit 109, and a candidate coordinate generating unit 110, as illustrated in FIG. 1.

The likelihood calculating unit 106 may extract a sub image including a candidate coordinate from a candidate coordinate within the area 203 and calculate likelihood that the sub image is an eye image. The candidate coordinate may be one or all of a coordinate calculated as an eye location when a face is recognized by the face recognition extracting unit 102 and a coordinate calculated by the candidate coordinate generating unit 110. In the event that the candidate coordinate generating unit 110 does not operate, the candidate coordinate may be a coordinate calculated as an eye location when a face is recognized by the face recognition extracting unit 102. The eye location may be defined on the basis of eyes, for example. At this time, the likelihood calculating unit 106 may extract a candidate sub image of a right eye and a candidate sub image of a left eye including a candidate coordinate, respectively. The likelihood calculating unit 106 may calculate likelihood on model and sample images of eyes and map the calculated likelihood to the candidate coordinate.

Also, as will be described later, the candidate coordinate generating unit 110 may calculate candidate center coordinates of the right and left eyes from model information of both eyes generated by the parameter generating unit 109.

The likelihood calculating unit 106 may include an ESF unit 107 and a linear discriminant analyzing (LDA) unit 108 as illustrated in FIG. 1. The ESF unit 107 may generate a sub image of 16 by 16 pixels from image information of the area 203 including both eyes and calculate likelihood that partial images are eyes from a brightness distribution. When generated from the area 203 including both eyes, the sub image of 16 by 16 pixels may be generated by specifying a partial image of image information of the area 203 including both eyes and thinning out pixels from the specified partial image. By generating a sub image having a constant size, it is possible to make a processing time constant at execution of hardware processing and to easily adjust timing. By applying a Gaussian filter to an image of the area 203 before generation of the sub image of 16 by 16 pixels, the degree of accuracy on eye recognition and performance on tracking may be improved.

In the event that a partial image is rectangular, for example, the partial image of image information for generation of the sub image may be specified by generating left upper coordinate, width, and height of the rectangular. A plurality of partial images may be specified. Such generation may be made based on coordinate information of both eyes when extraction is performed by the face recognition extracting unit 102 or may be made based on center coordinates of right and left eyes calculated by the candidate coordinate generating unit 110 as will be more fully described later.

Figure 3:
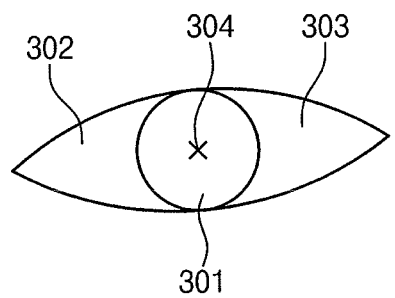
FIG. 3 illustrates a diagram for describing an operation of a likelihood calculating unit of a tracking device according to an embodiment.

FIG. 3 shows an exemplary eye image. In FIG. 3, a reference numeral 301 may indicate an eye's pupil and iris portion C1, and the brightness of the portion C1 may be lower than that of a portion C2 corresponding to reference numerals 302 and 303. Here, in the event that a coordinate of a center point 304 of the portion C1 is (x, y), for example, likelihood ESF(x, y) may be calculated by: $\sigma^2 b/\sigma^2 T$.

Herein, $\sigma^2 b = n_1(m_1-m)^2 + n_2(m_2-m)^2$ and $\sigma^2 T = \Sigma_{x \in C}(x-m)^2$. Wherein '$n_1$' indicates a total number of pixels included in the portion C1, '$n_2$' indicates a total number of pixels included in the portion C2, '$m_1$' indicates an average of luminance of the portion C1, '$m_2$' indicates an average of luminance of the portion C2, and 'm' indicates an average of luminance of the portion C. Also, 'C' may be the union of two sets C1 and C2.

The ESF unit 107 may extract a number, e.g., ten, upper sub images whose likelihood values are large, for example. It is possible to determine vivid eyes by using likelihood values thus calculated.

The LDA unit 108 may perform linear discrimination analysis from the partial image detected by the ESF unit 107 to make the degree of accuracy on determination of eyes high.

The LDA unit 108 may previously perform linear conversion on an image associated with eyes and an image not associated with eyes into a multidimensional range. For example, as described above, in the event that the ESF unit 107 uses a sub image of 16 by 16 pixels, an eye image and a non-eye image each having a size of 16 by 16 pixels may be prepared. Each image may be viewed as such a case that it indicates points of a 256-dimension (=16×16), and conversion into points of a 32-dimension may be made by performing linear conversion on points of each image.

Figure 4:
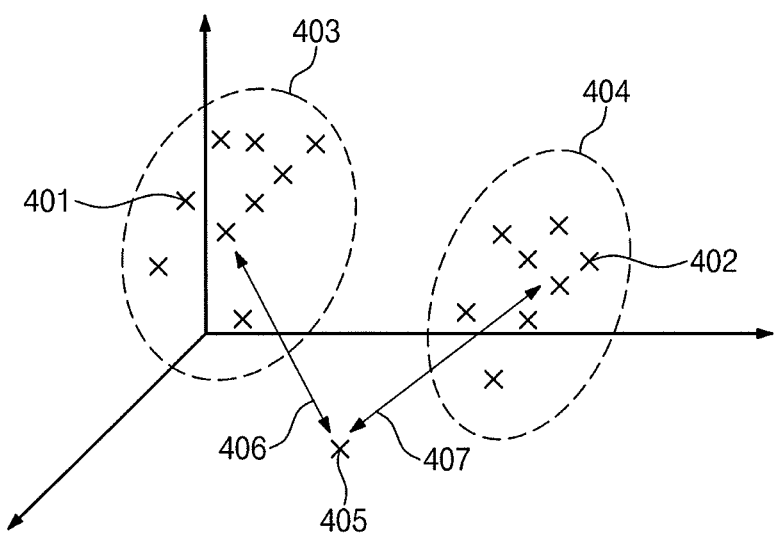
FIG. 4 illustrates a diagram for describing an operation of a likelihood calculating unit of a tracking device according to an embodiment.

FIG. 4 shows points of a converted 32-dimensional space. A point 401 shows a result of converting a non-eye sample image into points of a 32-dimensional space. Points obtained by converting the non-eye sample image into points of the 32-dimensional space may form a cluster 403. Also, the point 402 shows a result of converting an eye sample image into points of a 32-dimensional space. Points obtained by converting the eye sample image into points of the 32-dimensional space may form a cluster 404.

For each of a number, e.g., ten, upper sub images whose likelihood values are determined to be large through an ESF unit 107, each sub image may be converted into a 32-dimensional point 405, a distance 406 between the point 405 and the cluster 403, a distance 407 between the point 405 and the cluster 404 may be calculated, and likelihood that a partial image is an eye may be determined according to the distances 406 and 407. The distances 406 and 407 may be defined as distances between the point 405 and a center point of the cluster 403 and between the point 405 and a center point of the cluster 404, respectively. For example, if the distance 406 from the cluster 403 is shorter than the distance 407 from the cluster 404, a sub image may be determined not to be an eye image. If the distance 406 from the cluster 403 is longer than the distance 407 from the cluster 404, a sub image may be determined to be an eye image.

As described above, it is possible to decide likelihood on a candidate center coordinate of an eye using the likelihood calculating unit 106.

Figure 5:
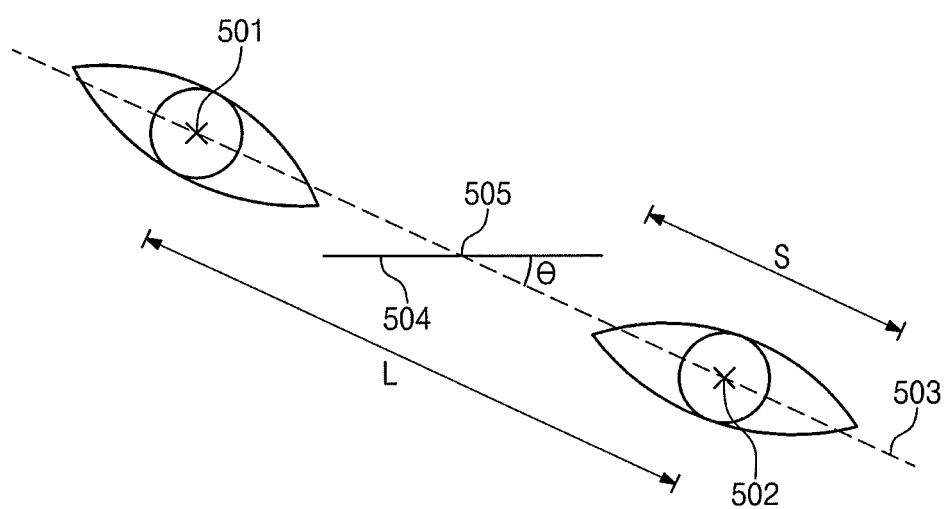
FIG. 5 illustrates a diagram for describing an operation of a candidate coordinate generating unit of a tracking device according to an embodiment.

The parameter generating unit 109 may generate eye model information based on the likelihood obtained by the likelihood calculating unit 106. The eye model information, as illustrated in FIG. 5, may include a distance L (e.g., the number of pixels in image information) between a center of a left eye and a center of a right eye at coordinates of centers 501 and 502 of both eyes, a width S (e.g., the number of pixels in image information) of each eye, an angle θ that a straight line 503 linking the centers 501 and 502 of both eyes forms with a horizontal line 504, and median point coordinates of the centers 501 and 502 of the both eyes. Parameter values such as L, S, θ, median point coordinates, etc., may be used to predict locations of eyes in a next frame and to generate eye model information. Prediction may be made by calculating a varying direction based on a history of L, S, θ, median point coordinates, etc., or using a particle filter technique. In the particle filter technique, assuming that a median point coordinate of a right eye is ($x_R$, $y_R$), a median point coordinate of a left eye is ($x_L$, $y_L$), and a median point coordinate of both eyes is ($x_C$, $y_C$), the likelihood (Likelihood($x_C$, $y_C$, L, S, θ)) may be defined by ESF($x_R$, $y_R$)×ESF($x_L$, $y_L$), and candidates of locations of eyes may be generated. In this case, a candidate whose Likelihood($x_C$, $y_C$, L, S, θ) is high may be used as is or a pseudo random number may be added. A candidate whose Likelihood($x_C$, $y_C$, L, S, θ) is low may be discarded.

Model information that the parameter generating unit 109 generates may be transferred to the candidate coordinate generating unit 110.

The candidate coordinate generating unit 110 may calculate candidate center coordinates of right and left eyes from the model information generated by the parameter generating unit 109. For example, referring to FIG. 5, an X coordinate of a candidate center coordinate 501 of the right eye may be calculated by adding −(L cos θ)/2 to an X coordinate of a center point 505, and an Y coordinate of the candidate center coordinate 501 of the right eye may be calculated by adding (L cos θ)/2 to an Y coordinate of the center point 505.

Figure 6:
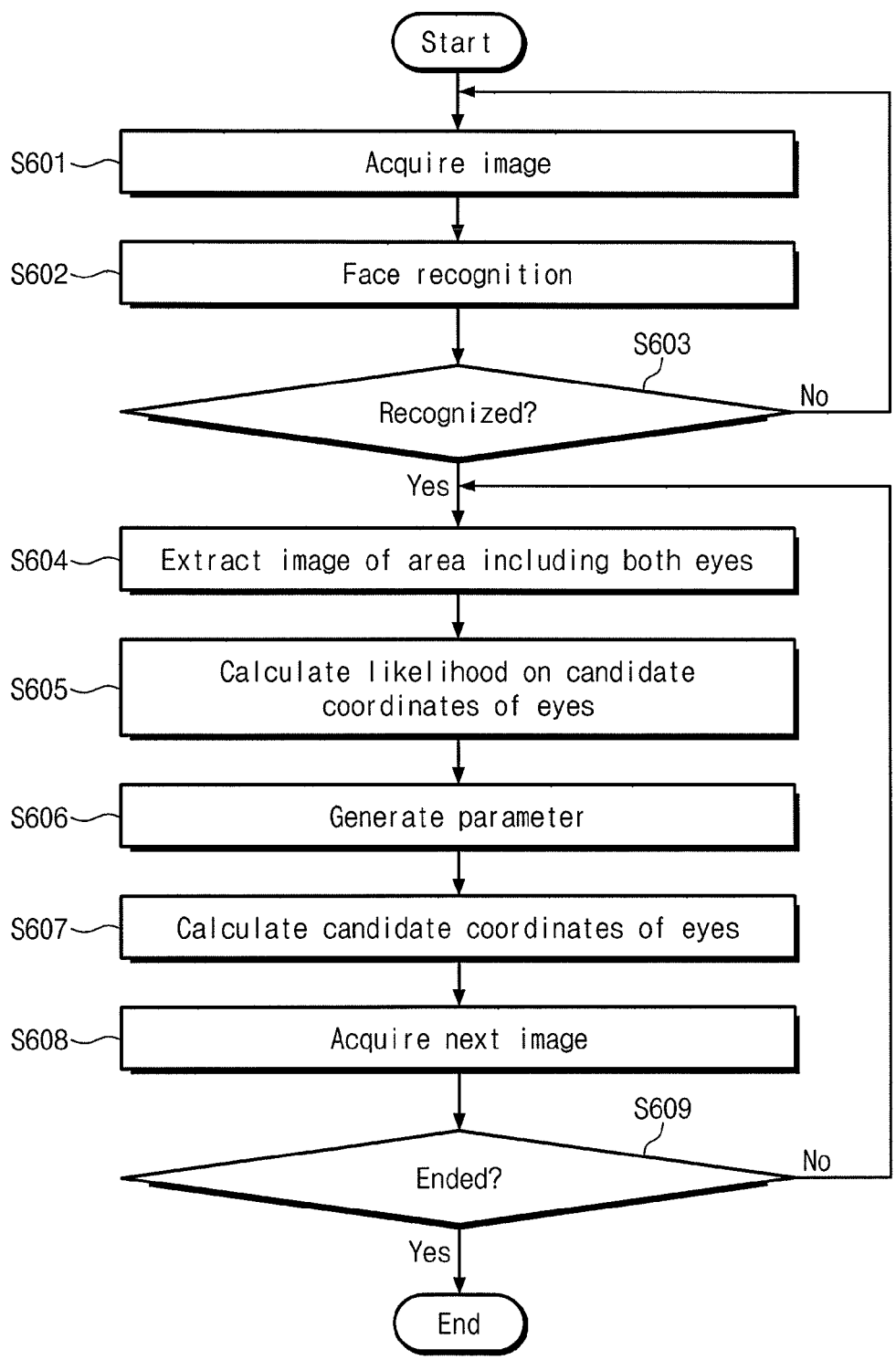
FIG. 6 illustrates a flow chart showing an operation of a tracking device according to an embodiment.

FIG. 6 is a flow chart for describing an operation of a tracking device according to an embodiment. In operation S601, the face recognition extracting unit 102 may acquire an image through the image acquisition unit 101. In step S602, for example, face recognition may be made by the face area recognizing unit 104. In step S603, whether a face is recognized may be determined. As a consequence of determining that a face is not recognized, the procedure returns to operation S601.

As a consequence of determining that a face is recognized, in operation S604, the eye area extracting unit 105 may extract an image of an area including both eyes. In operation S605, the likelihood calculating unit 106 may calculate likelihoods on candidate coordinates of eyes. In operation S606, the parameter generating unit 109 may generate eye model information. In operation S607, the candidate coordinate generating unit 110 may generate candidate coordinates of eyes.

In operation S608, a tracking unit 103 may acquire a frame of next image information from the image acquisition unit 101. In operation S609, whether to end the procedure may be determined. If not, the procedure goes to operation S604.

In operation S606, where an operation of the parameter generating unit 109 is performed, if a value of Likelihood($x_C$, $y_C$, L, S, θ) is smaller than a predetermined value, such that generation of eye model information is difficult, the procedure may return to operation S601. Also, for example, the procedure may return to operation S601 when a maximum value of likelihood calculated by the ESF unit 107 is smaller than a particular value or a sub image belongs to a cluster of a non-eye image.

Figure 7:
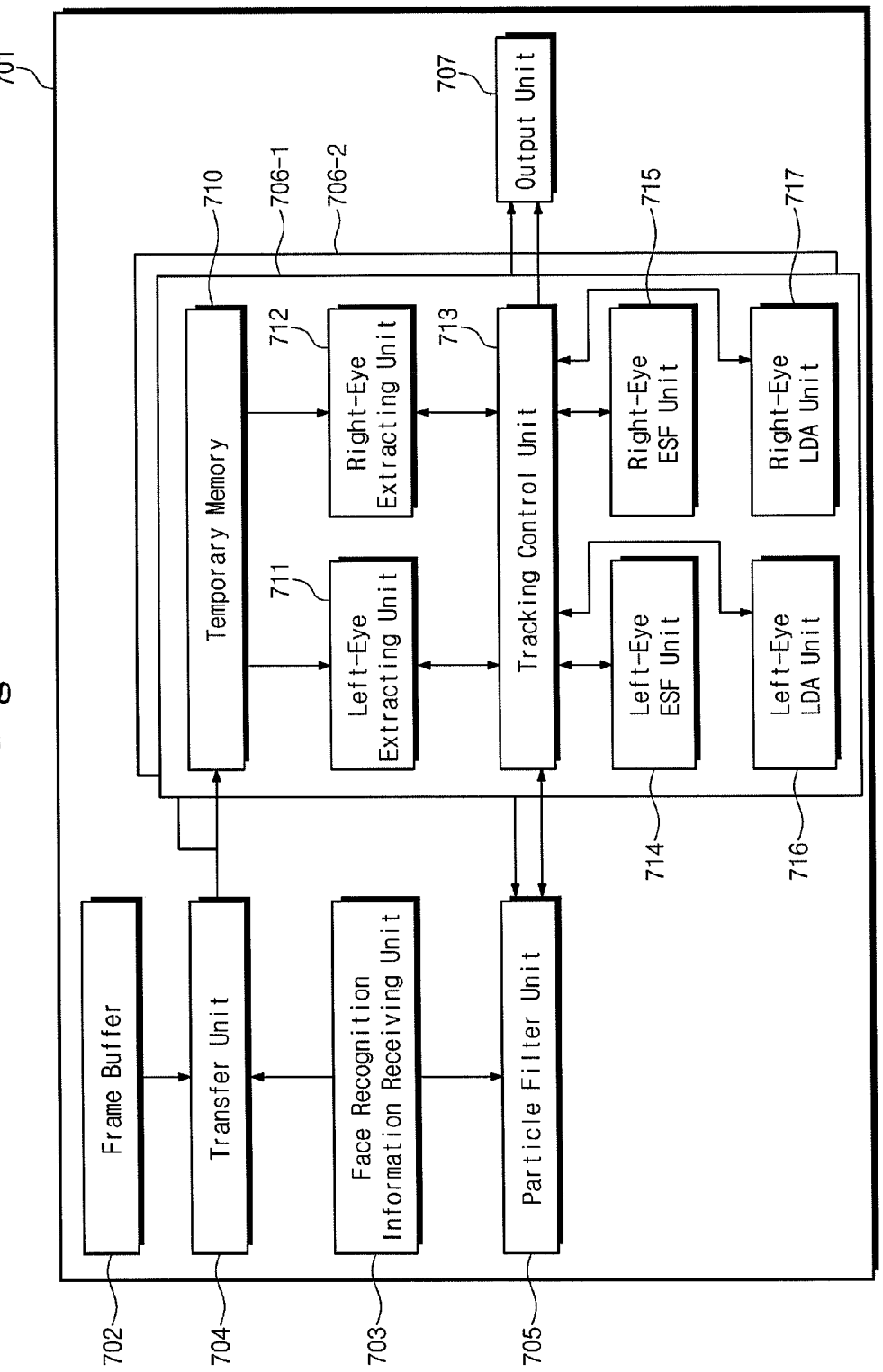
FIG. 7 illustrates a hardware block diagram for implementation of a tracking device according to an embodiment.

FIG. 7 is a block diagram schematically illustrating a hardware-based tracking device 100 shown in FIG. 1. A frame buffer 702 may be disposed to correspond to the image acquisition unit 101 and an acquired image may be stored in the frame buffer 702 by frame unit.

In FIG. 7, hardware corresponding to the face area recognizing unit 104 is not shown. A face recognition information receiving unit 703 may receive information of a face image recognized by hardware (not shown) corresponding to the face area recognizing unit 104, in particular, coordinate information of a quadrangle. The received face recognition information may be transferred to a transfer unit 704 and a particle filter unit 705.

The particle filter unit 705 may be hardware corresponding to the parameter generating unit 109 and may generate parameters for a next search operation.

The transfer unit 704 may read an area specified by face recognition information received by the face recognition information receiving unit 703 from the frame buffer 702, and may transfer the read area to hardware 706-1 and 706-2 respectively corresponding to the likelihood calculating unit 106 and the candidate coordinate generating unit 110. In FIG. 7, there is illustrated an example where there exist two hardware 706-1 and 706-2 respectively corresponding to the likelihood calculating unit 106 and the candidate coordinate generating unit 110. However, hardware corresponding to the likelihood calculating unit 106 and the candidate coordinate generating unit 110 may not be limited to two. The number of hardware corresponding to the likelihood calculating unit 106 and the candidate coordinate generating unit 110 may be random. In the event that a face included in an image exists in plurality, hardware respectively corresponding to the likelihood calculating unit 106 and the candidate coordinate generating unit 110 may be divided into a plurality of faces or into parameters generated by the particle filter unit 705.

An area transferred from the transfer unit 704 may be stored in a temporary memory 710. The area may be transferred to a left-eye extracting unit 711 and a right-eye extracting unit 712 as hardware corresponding to a likelihood calculating unit 106. The left-eye extracting unit 711 and the right-eye extracting unit 712 may extract a left-eye image and a right-eye image from the area, respectively. At this time, the left-eye extracting unit 711 and the right-eye extracting unit 712 may be controlled by a tracking control unit 713.

The tracking control unit 713 may control operations of a left-eye ESF unit 714 and a right-eye ESF unit 715 corresponding to an ESF unit 107 based on parameters obtained by the particle filter unit 705. Also, the tracking control unit 713 may control operations of a left-eye LDA unit 716 and a right-eye LDA unit 717 corresponding to a LDA unit 108, extract sub images of left and right eyes, calculate likelihood, and feed a result back to the particle filter unit 705. At the same time, the result may be output to an output unit 707.

Figure 8:
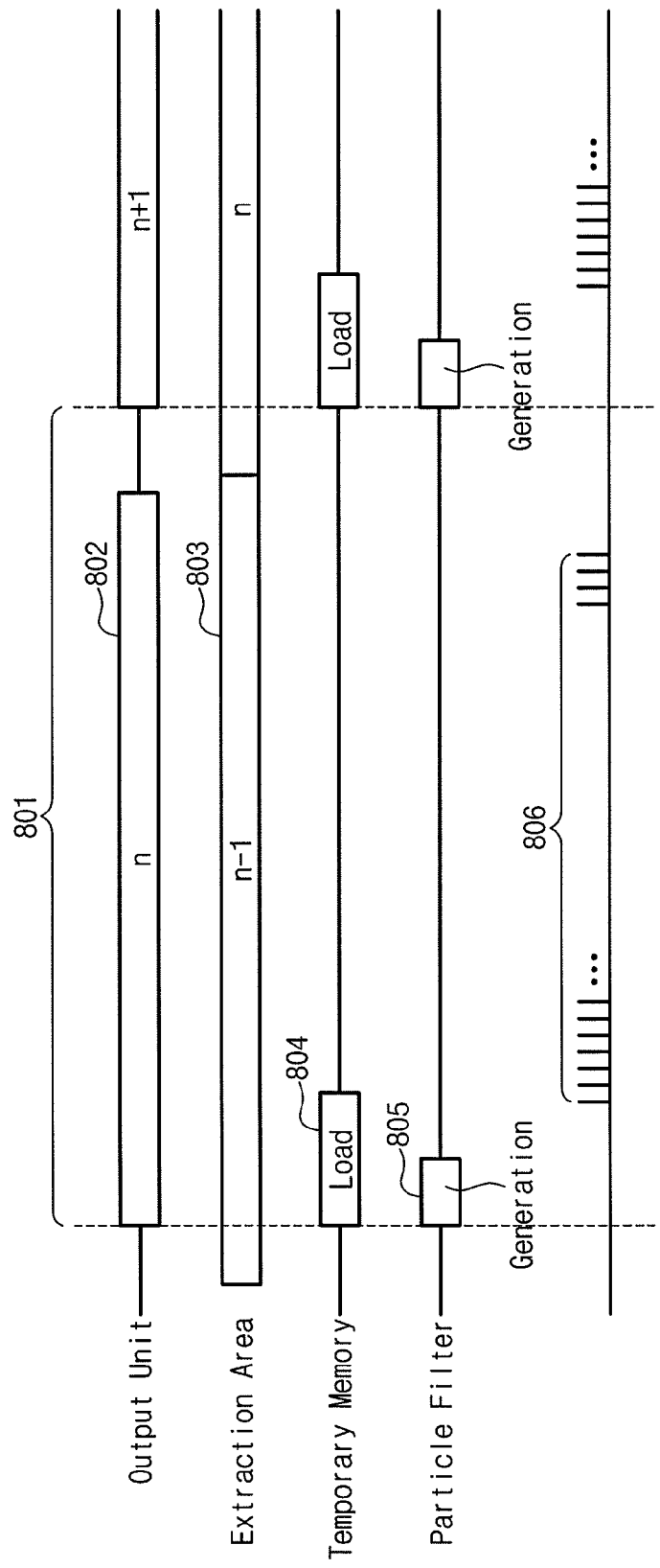
FIG. 8 illustrates a timing diagram for describing an operation of a hardware-based tracking device shown in FIG. 7.

FIG. 8 is a timing diagram for describing an operation of a hardware-based tracking device shown in FIG. 7. A period 801 may indicate a time corresponding to a frame. In a time period 802, nth frame data may be acquired by a capture device (e.g., a camera) or by an image information playback device. The acquired frame data may be sent to hardware to recognize a face, and a previous frame (e.g., (n−1)th frame) may be stored in the frame buffer 702.

In a time period 803, the face recognition information receiving unit 703 may receive a face recognition result. Also, face recognition on the (n−1)th frame data may be made.

In a time period 804, an image of an area including both eyes may be transferred from the transfer unit 704 to the temporary memory 710. Also, in a time period 805, the particle filter unit 705 may generate parameters. The upper limit of the number of parameters thus generated may be decided by the number processed by the likelihood calculating unit 106 and the candidate coordinate generating unit 110 from a rear portion of the time period 85 until the period 801. Thus, as hardware corresponding to the likelihood calculating unit 106 and the candidate coordinate generating unit 110 is additionally installed, a lot of parameters may be processed and the degree of accuracy of tracking may be bettered.

In a time period 806, searching and modeling may be made using respective parameters generated by the particle filter unit 705.

By way of summation and review, embodiments are directed to providing a tracking device suitable for implementation by hardware. To facilitate this suitability and/or improve performance, locations of eyes may be decided from a previous frame, time taken to process a sub image may be fixed, pixel may be thinned out, both eyes may be captured, parameters may be filtered, and/or locations of eyes may be determined within a time period in which a frame is acquired.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A tracking device, comprising:
an image information acquiring circuit to acquire image information for successive frames;
and
a tracker to generate a plurality of sub images from the acquired image information, each of the sub images smaller than each of the frames of the acquired image information, the tracker to calculate likelihoods that each of the sub images includes two eyes of the subject and to decide locations of the two eyes based on at least one of the sub images having a predetermined likelihood value,
wherein the tracker is to decide locations of the sub images based on locations decided for a previous frame of image information acquired before a current frame, calculate likelihoods of candidate coordinates of the two eyes of the subject based on the sub images, generate a model having parameters including a distance between the two eyes, a width of one eye, and an angle that a straight line linking the two eyes forms with a horizontal line, calculate center coordinates of right and left eyes from an information of the model and decide the locations of the eyes,
wherein an X coordinate of a candidate center coordinate of the right eye is calculated by adding $-(L \cos \theta)/2$ to an X coordinate of a center point between the right and left eyes and an Y coordinate of the candidate center coordinate of the right eye is calculated by adding $(L \cos \theta)/2$ to an Y coordinate of the center point, where L is the distance and $\theta$ is the angle.

2. The tracking device as claimed in claim 1, wherein the sub images generated by the tracker have a same size.

3. The tracking device as claimed in claim 1, wherein the tracker is to apply a Gaussian filter to the second image and thins out pixels to generate the plurality of sub images, respectively.

4. The tracking device as claimed in claim 1, wherein the tracker is to decide a location of each of the plurality of sub images using a particle filter on the parameters.

5. The tracking device as claimed in claim 4, wherein the particle filter is to generate locations of the sub images from which the tracker decides the locations of the two eyes within a time period in which the current frame is acquired.

6. The tracking device as claimed in claim 1, wherein the tracker is to calculate likelihoods based on luminance.

7. The tracking device as claimed in claim 1, wherein the tracker is to calculate likelihoods by comparing one or more of the sub images to a stored eye sample and a stored non-eye sample.

8. The tracking device as claimed in claim 1, wherein the predetermined likelihood value is a likelihood value larger than a likelihood value of at least one other sub image.

\* \* \* \* \*